UNITED STATES PATENT OFFICE.

FRANKE STUART HAVENS, OF HARTFORD, CONNECTICUT, ASSIGNOR TO HARRISON BROS. & CO., INC., OF PHILADELPHIA, PENNSYLVANIA, A CORPORATION OF PENNSYLVANIA.

PROCESS FOR THE MANUFACTURE OF RESIN SOAP.

981,647.

Specification of Letters Patent. Patented Jan. 17, 1911.

No Drawing. Application filed February 15, 1907. Serial No. 357,469.

*To all whom it may concern:*

Be it known that I, FRANKE STUART HAVENS, of Hartford, in the county of Hartford and State of Connecticut, (whose present post-office address is Thirty-fifth street and Grays Ferry Road, Philadelphia, Pennsylvania,) have invented a certain new and useful Process for the Manufacture of Resin Soap, whereof the following is a specification.

My invention relates to the manufacture of the so-called resin soap which is employed as the foundation of size for making paper or analogous products, and its object is to so conduct the preparation of the resin soap as to permit the control of its physical condition and chemical constitution and to preserve a definite and uniform character, without impairment of its solubility in the medium to be ultimately employed for its conversion into size.

Resin soap, as known in the art, is primarily a resinate of soda, usually carrying indefinite quantities of uncombined resin, or uncombined soda, or both. When prepared as has heretofore been usual in practice, by what may be termed the "wet way," (*i. e.* where the so-called saponifying action is effected in aqueous solution), the resultant product, while susceptible of evaporation down to a certain point, holds with great tenactity to a substantial residue of water. Where the resin soap is prepared as a commercial article of manufacture, intended for shipment to the mill where it is to be converted into size, reduction of its bulk is, of course, highly desirable, and attempts have been made to obtain it in a desiccated and comminuted form. So far as I am aware, however, this has not been commercially accomplished where the resin soap was primarily manufactured in aqueous solution, for although it has been proposed to evaporate such solution to dryness, and thereafter to grind the product, this treatment is attended by deleterious changes, it being commercially impossible to eliminate all the water, without breaking up the compound itself to some extent, or at least losing some of the constituent parts. The result has been that the dried resin soap lacks uniformity and definite character.

In an application for United States Letters Patent, filed simultaneously herewith by Hermann G. Schanche and myself, being Serial No. 357,506, we have set forth a new process for the manufacture of an inherently desiccated resin soap, the characteristic of the process being that the chemical combination of the ingredients, or so-called saponifying action, instead of being effected in the "wet way", is attained either in the absence of water, or with only so much water present as shall disappear to the desired extent during the reaction and subsequent cooling of the product. In this process, the immediate product is in a condition of liquefaction by heat, as distinguished from aqueous solution.

I have discovered that a properly desiccated soap of uniform constitution, and in the desired physical condition, can be obtained by a process which involves solution, as distinguished from liquefaction by heat, but which is free from the disadvantages of aqueous solution. To this end I proceed as follows:—I employ, during the so-called saponifying reaction, a volatile non-aqueous solvent, such as the alcohols, benzin, bensol, petroleum, ethers, or their equivalents, in such quantity as to initially obtain the alkaline resinate in a state of solution in said non-aqueous solvent. The presence of a limited amount of water may be tolerated during the process, but the characteristic feature is that the solution of the resin soap itself, is not an aqueous one, but depends upon the presence of the non-aqueous solvent as the efficient dissolving medium. Thus, as a typical process, I take 100 pounds of resin and dissolve it in say 100 pounds of ordinary commercial alcohol. To this I add nine pounds of caustic soda, preferably also in alcoholic solution, and maintain the ingredients at a temperature approximately the boiling point of the solvent, until the saponifying action has taken place. The product is then dried by distilling off the volatile solvent which may be condensed and recovered by any of the well known apparatus adapted for that purpose.

Where the soda is employed in the form of soda ash, it may be desirable to add thereto water in just sufficient quantity to insure diffusion and prevent undue segregation, but not exceeding the percentage which is contained in dry crystalline carbonate of soda, and to add the soda to the resin in which has previously been dissolved in the volatile non-aqueous solvent. Under such circumstances, the water will disappear in the act of combination, and no aqueous solution of the resin soap will be formed. Here, as before, the solution is heated until saponification is complete, and the alcohol is evaporated and recovered.

When either of the above methods of procedure is followed, I have found that the product may be obtained in a desiccated condition without the disadvantages which are found when any attempt is made to obtain it by evaporation to dryness from a true aqueous solution.

Having thus described my invention, I wish it to be understood that I recognize the existence, in the prior art, of various wet processes for the manufacture of resin soap, and I, of course, do not claim any of the features characteristic of said processes. My invention depends upon the discovery that when the saponifying reaction is conducted in a dissolving medium, which is substantially non-aqueous in its character, even though water be incidentally present, the resultant product lends itself to the drying process in a wholly different manner from that which is characteristic of a substantially aqueous solution.

Having thus described my invention, I claim:—

The process of manufacturing desiccated resin soap, consisting in dissolving resin in a non-aqueous solvent, adding thereto a smaller proportion of a non-aqueous solution of soda, whereby a resin soap free from water and wholly in a state of solution in said non-aqueous solvent is obtained, and subsequently evaporating said solvent.

In testimony whereof, I have hereunto signed my name, at Philadelphia, Pennsylvania, this 13th day of February 1907.

FRANKE STUART HAVENS.

Witnesses:
SAMUEL J. TAYLOR,
JAMES H. BELL.